(12) United States Patent
Raghavan et al.

(10) Patent No.: US 11,785,490 B2
(45) Date of Patent: Oct. 10, 2023

(54) CONFIGURING MEASUREMENT GAPS FOR NETWORK-ASSISTED CALIBRATION PROCEDURES AND/OR PERFORMING NETWORK-ASSISTED CALIBRATION PROCEDURES USING SERVING BEAMS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 220 days.

(21) Appl. No.: 17/302,738

(22) Filed: May 11, 2021

(65) Prior Publication Data

US 2021/0400513 A1 Dec. 23, 2021

Related U.S. Application Data

(60) Provisional application No. 63/042,182, filed on Jun. 22, 2020.

(51) Int. Cl.
*H04W 24/10* (2009.01)
*H04W 24/08* (2009.01)

(52) U.S. Cl.
CPC .......... *H04W 24/10* (2013.01); *H04W 24/08* (2013.01)

(58) Field of Classification Search
CPC ..... H04W 24/10; H04W 24/08; H04W 48/16; H04B 17/24; H04B 17/12; H04B 17/21
See application file for complete search history.

(56) References Cited

U.S. PATENT DOCUMENTS

| | | | |
|---|---|---|---|
| 2006/0019668 A1* | 1/2006 | Kraiem | H04L 12/40052 455/446 |
| 2017/0134105 A1* | 5/2017 | Miao | H04B 17/12 |
| 2018/0206138 A1* | 7/2018 | Hayashi | H04W 24/10 |
| 2018/0279311 A1* | 9/2018 | Yoo | H04W 8/245 |
| 2019/0104549 A1* | 4/2019 | Deng | H04L 27/2607 |
| 2020/0076517 A1* | 3/2020 | Zhu | H01Q 3/267 |
| 2021/0266898 A1* | 8/2021 | Cha | H04W 24/10 |

* cited by examiner

*Primary Examiner* — Walli Z Butt
*Assistant Examiner* — Thad N Defauw
(74) *Attorney, Agent, or Firm* — Harrity & Harrity, LLP

(57) ABSTRACT

Various aspects of the present disclosure generally relate to wireless communication. In some aspects, a user equipment may receive, from a base station, a configuration of at least one measurement gap based at least in part on a gap request associated with a network-assisted antenna calibration procedure; and perform, during the at least one measurement gap, a calibration measurement corresponding to the network-assisted antenna calibration procedure. Numerous other aspects are provided.

27 Claims, 7 Drawing Sheets

CONFIGURING MEASUREMENT GAPS FOR NETWORK-ASSISTED CALIBRATION PROCEDURES AND/OR PERFORMING NETWORK-ASSISTED CALIBRATION PROCEDURES USING SERVING BEAMS

CROSS-REFERENCE TO RELATED APPLICATION

This Patent Application claims priority to U.S. Provisional Patent Application No. 63/042,182, filed on Jun. 22, 2020, entitled "CONFIGURING MEASUREMENT GAPS FOR NETWORK-ASSISTED CALIBRATION PROCEDURES AND/OR PERFORMING NETWORK-ASSISTED CALIBRATION PROCEDURES USING SERVING BEAMS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for configuring measurement gaps for network-assisted calibration procedures and/or performing network-assisted calibration procedures using serving beams.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station, a configuration of at least one measurement gap based at least in part on a gap request associated with a network-assisted antenna calibration procedure; and performing, during the at least one measurement gap, a calibration measurement corresponding to the network-assisted antenna calibration procedure.

In some aspects, a method of wireless communication, performed by a base station, may include transmitting, to a UE, a configuration of at least one measurement gap based at least in part on a gap request associated with a network-assisted antenna calibration procedure; and receiving, from the UE, a calibration measurement report that indicates a calibration measurement performed during the at least one measurement gap, wherein the calibration measurement corresponds to the network-assisted antenna calibration procedure.

In some aspects, a method of wireless communication, performed by a UE, may include receiving, from a base station, a calibration signal associated with a network-assisted antenna calibration procedure, wherein the calibration signal is received using a serving beam; and performing, based at least in part on the calibration signal, a calibration measurement corresponding to the network-assisted antenna calibration procedure.

In some aspects, a method of wireless communication, performed by a base station, may include transmitting, to a UE, a calibration signal associated with a network-assisted antenna calibration procedure, wherein the calibration signal is transmitted using a serving beam; and receiving, from the UE, a calibration measurement report that indicates a calibration measurement based at least in part on the calibration signal, wherein the calibration measurement corresponds to the network-assisted antenna calibration procedure.

In some aspects, a UE for wireless communication may include a memory and one or more processors coupled to the memory. The one or more processors may be configured to receive, from a base station, a configuration of at least one measurement gap based at least in part on a gap request associated with a network-assisted antenna calibration procedure; and perform, during the at least one measurement gap, a calibration measurement corresponding to the network-assisted antenna calibration procedure.

In some aspects, a base station for wireless communication may include a memory and one or more processors coupled to the memory. The one or more processors may be configured to transmit, to a UE, a configuration of at least one measurement gap based at least in part on a gap request associated with a network-assisted antenna calibration procedure; and receive, from the UE, a calibration measurement report that indicates a calibration measurement performed during the at least one measurement gap, wherein the calibration measurement corresponds to the network-assisted antenna calibration procedure.

In some aspects, a UE for wireless communication may include a memory and one or more processors coupled to the memory. The one or more processors may be configured to receive, from a base station, a calibration signal associated with a network-assisted antenna calibration procedure, wherein the calibration signal is received using a serving beam; and perform, based at least in part on the calibration signal, a calibration measurement corresponding to the network-assisted antenna calibration procedure.

In some aspects, a base station for wireless communication may include a memory and one or more processors coupled to the memory. The one or more processors may be configured to transmit, to a UE, a calibration signal associated with a network-assisted antenna calibration procedure, wherein the calibration signal is transmitted using a serving beam; and receive, from the UE, a calibration measurement report that indicates a calibration measurement based at least in part on the calibration signal, wherein the calibration measurement corresponds to the network-assisted antenna calibration procedure.

In some aspects, a non-transitory computer-readable medium may store one or more instructions for wireless communication. The one or more instructions, when executed by one or more processors of a UE, may cause the one or more processors to receive, from a base station, a configuration of at least one measurement gap based at least in part on a gap request associated with a network-assisted antenna calibration procedure; and perform, during the at least one measurement gap, a calibration measurement corresponding to the network-assisted antenna calibration procedure.

In some aspects, a non-transitory computer-readable medium may store one or more instructions for wireless communication. The one or more instructions, when executed by one or more processors of a base station, may cause the one or more processors to transmit, to a UE, a configuration of at least one measurement gap based at least in part on a gap request associated with a network-assisted antenna calibration procedure; and receive, from the UE, a calibration measurement report that indicates a calibration measurement performed during the at least one measurement gap, wherein the calibration measurement corresponds to the network-assisted antenna calibration procedure.

In some aspects, a non-transitory computer-readable medium may store one or more instructions for wireless communication. The one or more instructions, when executed by one or more processors of a UE, may cause the one or more processors to receive, from a base station, a calibration signal associated with a network-assisted antenna calibration procedure, wherein the calibration signal is received using a serving beam; and perform, based at least in part on the calibration signal, a calibration measurement corresponding to the network-assisted antenna calibration procedure.

In some aspects, a non-transitory computer-readable medium may store one or more instructions for wireless communication. The one or more instructions, when executed by one or more processors of a base station, may cause the one or more processors to transmit, to a UE, a calibration signal associated with a network-assisted antenna calibration procedure, wherein the calibration signal is transmitted using a serving beam; and receive, from the UE, a calibration measurement report that indicates a calibration measurement based at least in part on the calibration signal, wherein the calibration measurement corresponds to the network-assisted antenna calibration procedure.

In some aspects, an apparatus for wireless communication may include means for receiving, from a base station, a configuration of at least one measurement gap based at least in part on a gap request associated with a network-assisted antenna calibration procedure; and means for performing, during the at least one measurement gap, a calibration measurement corresponding to the network-assisted antenna calibration procedure.

In some aspects, an apparatus for wireless communication may include means for transmitting, to a UE, a configuration of at least one measurement gap based at least in part on a gap request associated with a network-assisted antenna calibration procedure; and means for receiving, from the UE, a calibration measurement report that indicates a calibration measurement performed during the at least one measurement gap, wherein the calibration measurement corresponds to the network-assisted antenna calibration procedure.

In some aspects, an apparatus for wireless communication may include means for receiving, from a base station, a calibration signal associated with a network-assisted antenna calibration procedure, wherein the calibration signal is received using a serving beam; and means for performing, based at least in part on the calibration signal, a calibration measurement corresponding to the network-assisted antenna calibration procedure.

In some aspects, an apparatus for wireless communication may include means for transmitting, to a UE, a calibration signal associated with a network-assisted antenna calibration procedure, wherein the calibration signal is transmitted using a serving beam; and means for receiving, from the UE, a calibration measurement report that indicates a calibration measurement based at least in part on the calibration signal, wherein the calibration measurement corresponds to the network-assisted antenna calibration procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
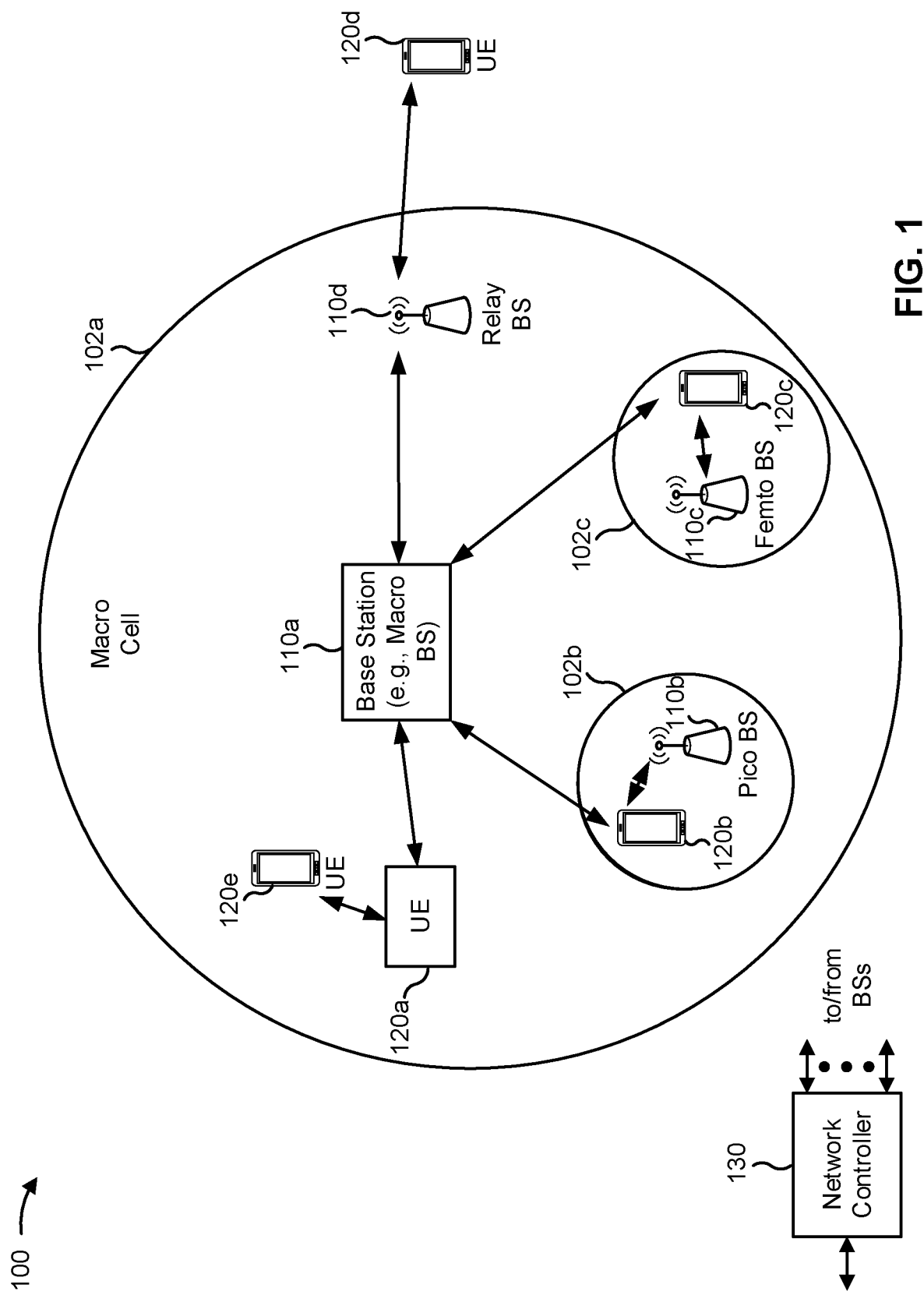
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
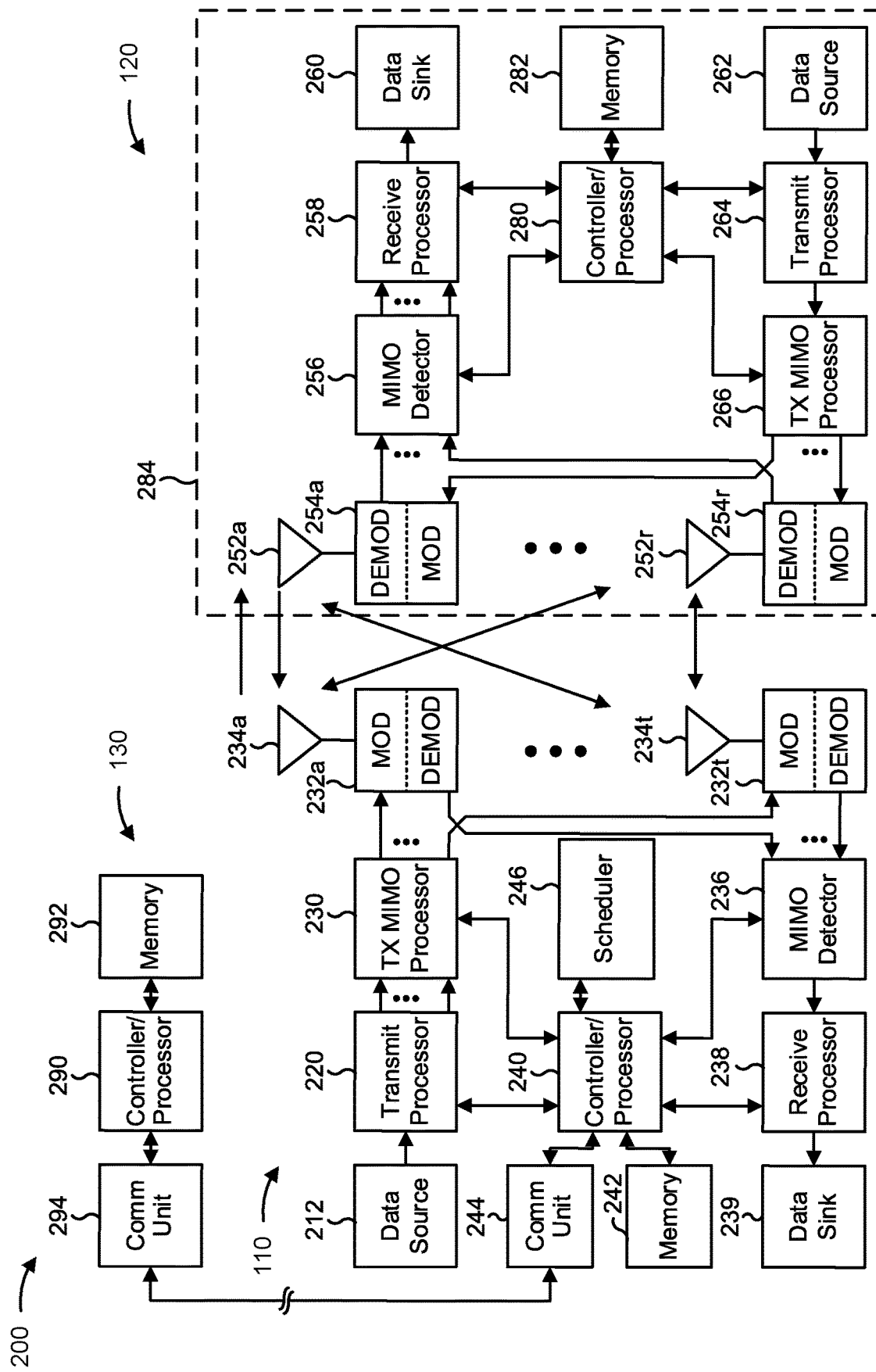
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7).

Controller/processor 240 of base station 110, controller/processor 280 of UE 120, and/or any other component(s) of FIG. 2 may perform one or more techniques associated with configuring measurement gaps for network-assisted calibration procedures and/or performing network-assisted calibration procedures using serving beams, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving, from a base station, a configuration of at least one measurement gap based at least in part on a gap request associated with a network-assisted antenna calibration procedure, means for performing, during the at least one measurement gap, a calibration measurement corresponding to the network-assisted antenna calibration procedure, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a configuration of at least one measurement gap based at least in part on a gap request associated with a network-assisted antenna calibration procedure, means for receiving, from the UE, a calibration measurement report that indicates a calibration measurement performed during the at least one measurement gap, wherein the calibration measurement corresponds to the network-assisted antenna calibration procedure, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving, from a base station, a calibration signal associated with a network-assisted antenna calibration procedure, wherein the calibration signal is received using a serving beam, means for performing, based at least in part on the calibration signal, a calibration measurement corresponding to the network-assisted antenna calibration procedure, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a calibration signal associated with a network-assisted antenna calibration procedure, wherein the calibration signal is transmitted using a serving beam, means for performing a base station-assisted calibration of at least one antenna element on at least one panel associated with the UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Beamforming may be used in NR implementations to facilitate coherently combining energy and overcoming high path losses observed at higher frequencies. This may be particularly useful with millimeter wave communications. To assist with signaling, beamforming weights for receiving communications may be computed based on antennas of UEs. The weights calculated for receiving may not be reused for transmitting since the radio frequency (RF) hardware and processing for transmitting communications is different than the RF hardware and processing for receiving communications.

A typical approach includes performing a self-test and calibrating each antenna and each RF chain (receive chain, transmit chain, and/or the like) separately. This approach may result in unnecessary consumption of processing resources and/or time resources. Self-testing and calibration also may introduce calibration errors that can lead to loss in beamforming performance, resulting in higher latency. In some cases, larger codebook sizes may be used, but this may result in higher latency, power consumption, temperature, and/or the like. Network-assisted calibration techniques may be used for facilitating calibration of antenna elements without relying on costly self-testing and calibrating. However, network-assisted calibration techniques may result in consumption of useable communication resources and time resources and/or may be challenging to perform due to the devices being engaged in communications using resources that are not allocated for network-assisted calibration.

Measurement gaps may be used to facilitate calculations, channel sensing, and/or the like. A measurement gap is a time duration during which a UE suspends signaling to a serving cell. In some cases, measurement gaps may be used to facilitate UE measurement of neighbor cell signal characteristics. Measurement gaps may be associated with UEs, frequency resources, and/or the like.

According to aspects of techniques and apparatuses described herein, a UE may receive a configuration of a measurement gap during which the UE may perform measurements, based at least in part on a beam that is different than a serving beam, associated with a network-assisted calibration procedure. As a result, costly self-testing and calibrating may be reduced or avoided, and assisted calibration may be performed without unnecessary interruptions in communication. As a result, aspects described herein may facilitate conservation of communication resources, reduction of latency, and/or the like.

In some aspects, the UE may use a serving beam for performing measurements associated with a network-assisted calibration procedure. In this way, calibration error may be reduced without consuming unnecessary communication resources or time resources, leading to improved beamforming performance, which may result in reduced latency and/or higher throughput, without an increase in consumption of communication resources, time resources, and/or the like.

Figure 3:
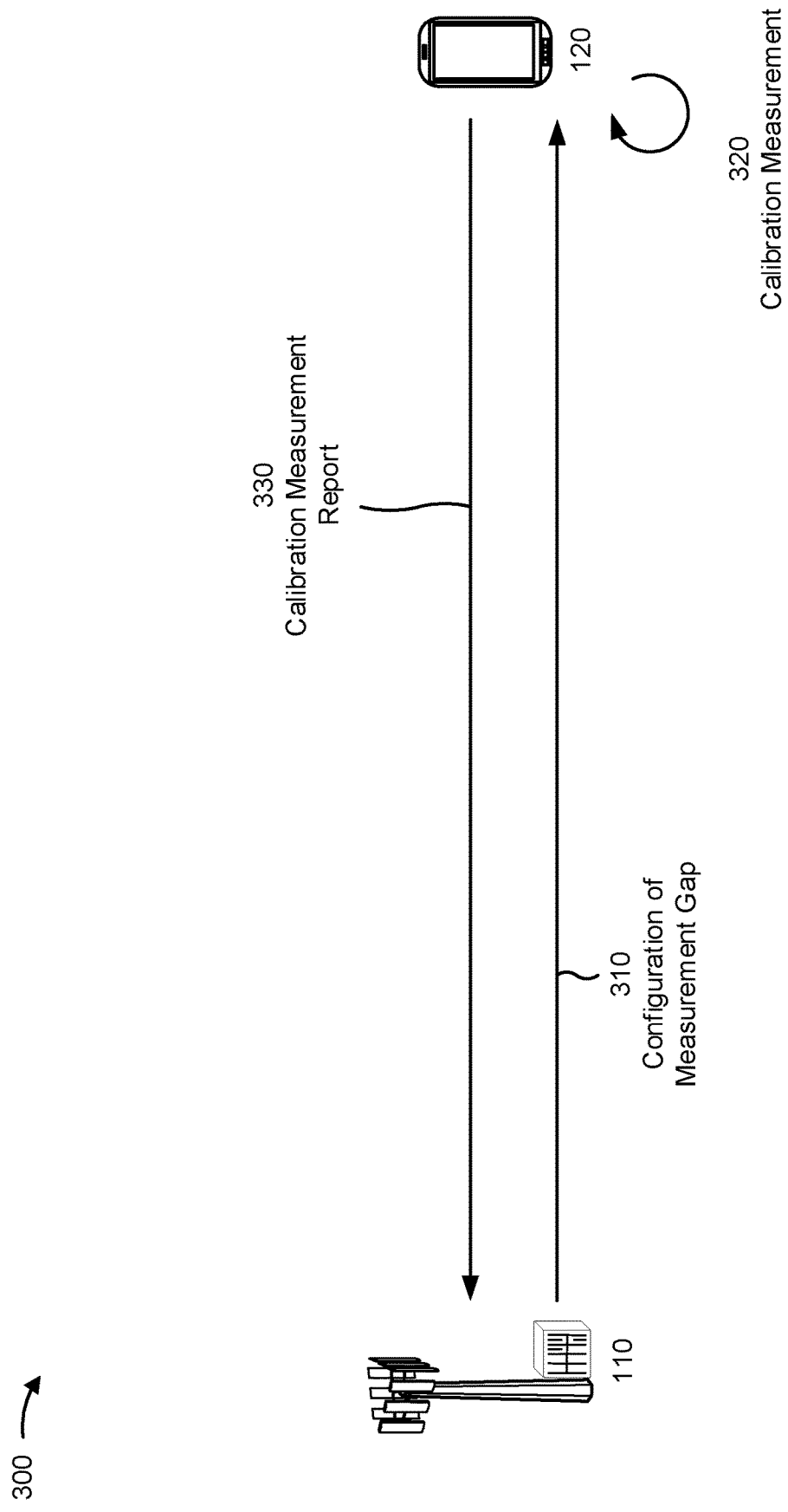
FIG. 3 is a diagram illustrating an example associated with configuring measurement gaps for network-assisted calibration procedures and/or performing network-assisted calibration procedures using serving beams, in accordance with the present disclosure.

FIG. 3 is a diagram illustrating an example 300 associated with configuring measurement gaps for network-assisted calibration procedures and/or performing network-assisted calibration procedures using serving beams, in accordance with the present disclosure. As shown in FIG. 3, a base station 110 and a UE 120 may communicate with one another.

As shown by reference number 310, the base station 110 may transmit, and the UE 120 may receive, a configuration of at least one measurement gap. In some aspects, the configuration of the measurement gap may be based at least in part on a gap request associated with a network-assisted antenna calibration procedure. In some aspects, the network-assisted antenna calibration procedure may include a UE-assisted calibration of at least one antenna element on at least one panel associated with the base station 110, or a base station-assisted calibration of at least one antenna element on at least one panel associated with the UE 120.

In some aspects, the configuration of the at least one measurement gap may include an indication of a UE capability. The UE capability may correspond to a first threshold corresponding to a lower bound of a periodicity associated with the at least one measurement gap, a second threshold corresponding to an upper bound of a quantity of measurement gaps of the at least one measurement gap, and/or the like. In some aspects, at least one of the first threshold, the second threshold, or a combination thereof may be based at least in part on a capability report transmitted by the UE 120 to the base station 110, a calibration objective associated with the UE 120, a calibration objective associated with the base station 110, and/or the like.

In some aspects, the base station 110 may distribute calibration overhead across multiple UEs 120 associated with a serving cell provided by the base station 110. In some aspects, the base station 110 may distribute the overhead by transmitting, to at least one additional UE, at least one additional configuration of at least one additional measurement gap. The at least one additional configuration may be based at least in part on at least one additional gap request associated with the network-assisted antenna calibration procedure.

In some aspects, the base station 110 may transmit, and the UE 120 may receive, the gap request. In those aspects, the network-assisted antenna calibration procedure may include a UE-assisted calibration of at least one antenna element on at least one panel associated with the base station 110. In some aspects, the UE 120 may transmit, and the base station 110 may receive, the gap request. In those aspects, the network-assisted antenna calibration procedure may include a base station-assisted calibration of at least one antenna element on at least one panel associated with the UE 120.

As shown by reference number 320, the UE 120 may perform a calibration measurement corresponding to the network-assisted antenna calibration procedure. In some aspects, the UE 120 may perform the calibration measurement using a beam that is different than a serving beam allocated for a communication between the UE 120 and the base station 110. The UE 120 may perform the calibration measurement during the at least one measurement gap configured by the base station 110.

In some aspects, the UE 120 may perform the calibration measurement using the serving beam. In some of those aspects, a measurement gap may not be used. In some aspects, the base station 110 may transmit a calibration signal to the UE 120 using the serving beam. In some aspects, the base station 110 may multiplex the calibration signal with a synchronization signal/physical broadcast channel (SS/PBCH) block. In some aspects, the base station 110 may multiplex the calibration signal with the SS/PBCH block by multiplexing the calibration signal with the SS/PBCH block in a frequency domain.

As shown by reference number 330, the UE 120 may transmit, and the base station 110 may receive, a calibration measurement report. The calibration measurement report may indicate the calibration measurement.

According to aspects of techniques described above, configuration of measurement gaps during which UEs may perform measurements associated with network-assisted calibration procedure may facilitate network-assisted calibration associated with beams that are different than serving beams. As a result, costly self-testing and calibrating may be reduced or avoided, and assisted calibration may be performed without unnecessary interruptions in communication.

In some aspects, a serving beam may be used for performing measurements associated with a network-assisted calibration procedure. In this way, calibration error may be reduced without consuming unnecessary communication resources or time resources, leading to improved beamforming performance, which may result in reduced latency and/or higher throughput, without an increase in consumption of communication resources, time resources, and/or the like.

As indicated above, FIG. 3 is provided as an example. Other examples may differ from what is described with regard to FIG. 3.

Figure 4:
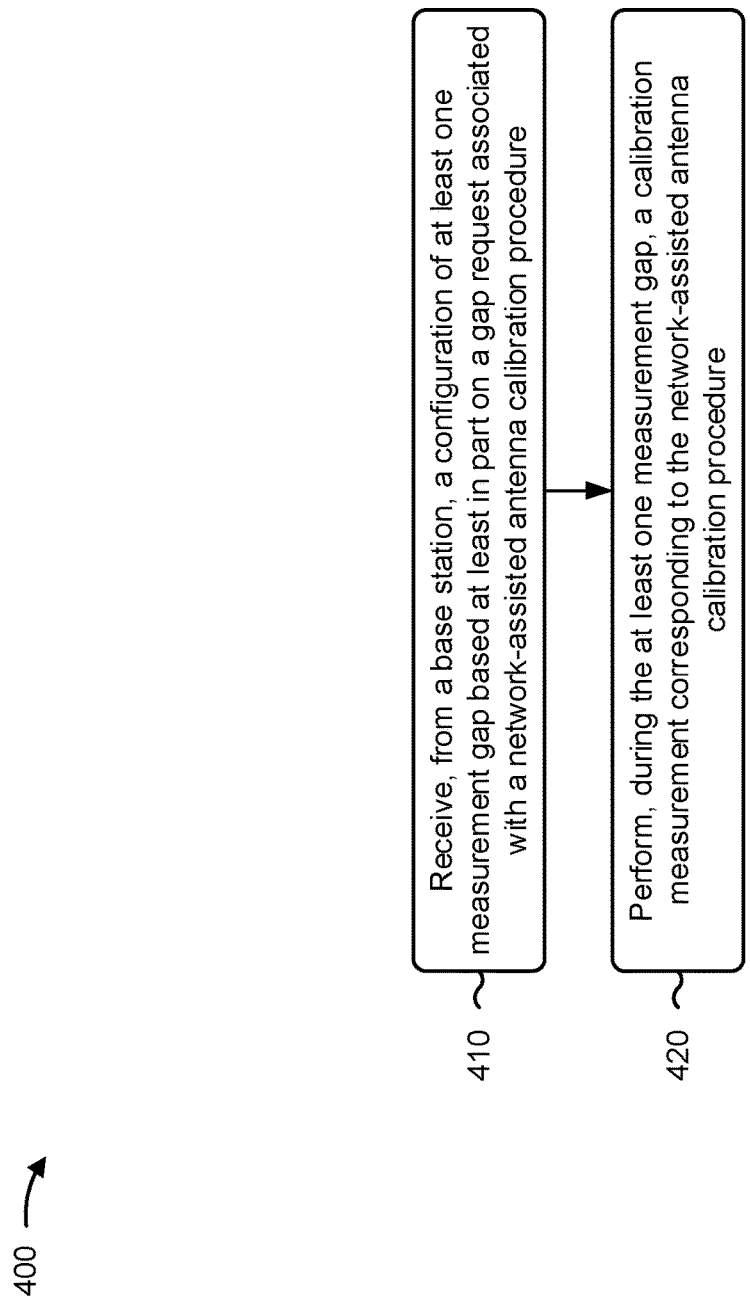
FIGS. 4 and 5 are diagrams illustrating examples associated with configuring measurement gaps for network-assisted calibration procedures, in accordance with the present disclosure.

FIG. 4 is a diagram illustrating an example process 400 performed, for example, by a UE, in accordance with the present disclosure. Example process 400 is an example where the UE (e.g., UE 120 and/or the like) performs operations associated with configuring measurement gaps for network-assisted calibration procedures.

As shown in FIG. 4, in some aspects, process 400 may include receiving, from a base station, a configuration of at least one measurement gap based at least in part on a gap request associated with a network-assisted antenna calibration procedure (block 410). For example, the UE (e.g., using receive processor 258, controller/processor 280, memory 282, and/or the like) may receive, from a base station, a configuration of at least one measurement gap based at least in part on a gap request associated with a network-assisted antenna calibration procedure, as described above.

As further shown in FIG. 4, in some aspects, process 400 may include performing, during the at least one measurement gap, a calibration measurement corresponding to the network-assisted antenna calibration procedure (block 420). For example, the UE (e.g., using receive processor 258, transmit processor 264, controller/processor 280, memory 282, and/or the like) may perform, during the at least one measurement gap, a calibration measurement corresponding to the network-assisted antenna calibration procedure, as described above.

Process 400 may include additional aspects, such as any single aspect or any combination of aspects described below and/or in connection with one or more other processes described elsewhere herein.

In a first aspect, performing the calibration measurement comprises performing the calibration measurement using a beam that is different than a serving beam allocated for a communication between the UE and the base station.

In a second aspect, alone or in combination with the first aspect, process 400 includes receiving, from the base station, the gap request, wherein the network-assisted antenna calibration procedure comprises a UE-assisted calibration of at least one antenna element on at least one panel associated with the base station.

In a third aspect, alone or in combination with the first aspect, process 400 includes transmitting, to the base station, the gap request, wherein the network-assisted antenna calibration procedure comprises a base station-assisted calibration of at least one antenna element on at least one panel associated with the UE.

In a fourth aspect, alone or in combination with one or more of the first through third aspects, process 400 includes transmitting, to the base station, a calibration measurement report that indicates the calibration measurement.

In a fifth aspect, alone or in combination with the fourth aspect, the calibration measurement report comprises a dedicated report associated with the network-assisted antenna calibration procedure.

In a sixth aspect, alone or in combination with one or more of the first through fifth aspects, the network-assisted antenna calibration procedure comprises a UE-assisted calibration of at least one antenna element on at least one panel associated with the base station, or a base station-assisted calibration of at least one antenna element on at least one panel associated with the UE.

In a seventh aspect, alone or in combination with one or more of the first through sixth aspects, the configuration of the at least one measurement gap comprises an indication of a UE capability.

In an eighth aspect, alone or in combination with the seventh aspect, the UE capability corresponds to at least one of a first threshold corresponding to a lower bound of a periodicity associated with the at least one measurement gap, a second threshold corresponding to an upper bound of a quantity of measurement gaps of the at least one measurement gap, or a combination thereof.

In a ninth aspect, alone or in combination with the eighth aspect, at least one of the first threshold, the second threshold, or a combination thereof is based at least in part on at least one of a capability report transmitted by the UE to the base station, a calibration objective associated with the UE, a calibration objective associated with the base station, or a combination thereof.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
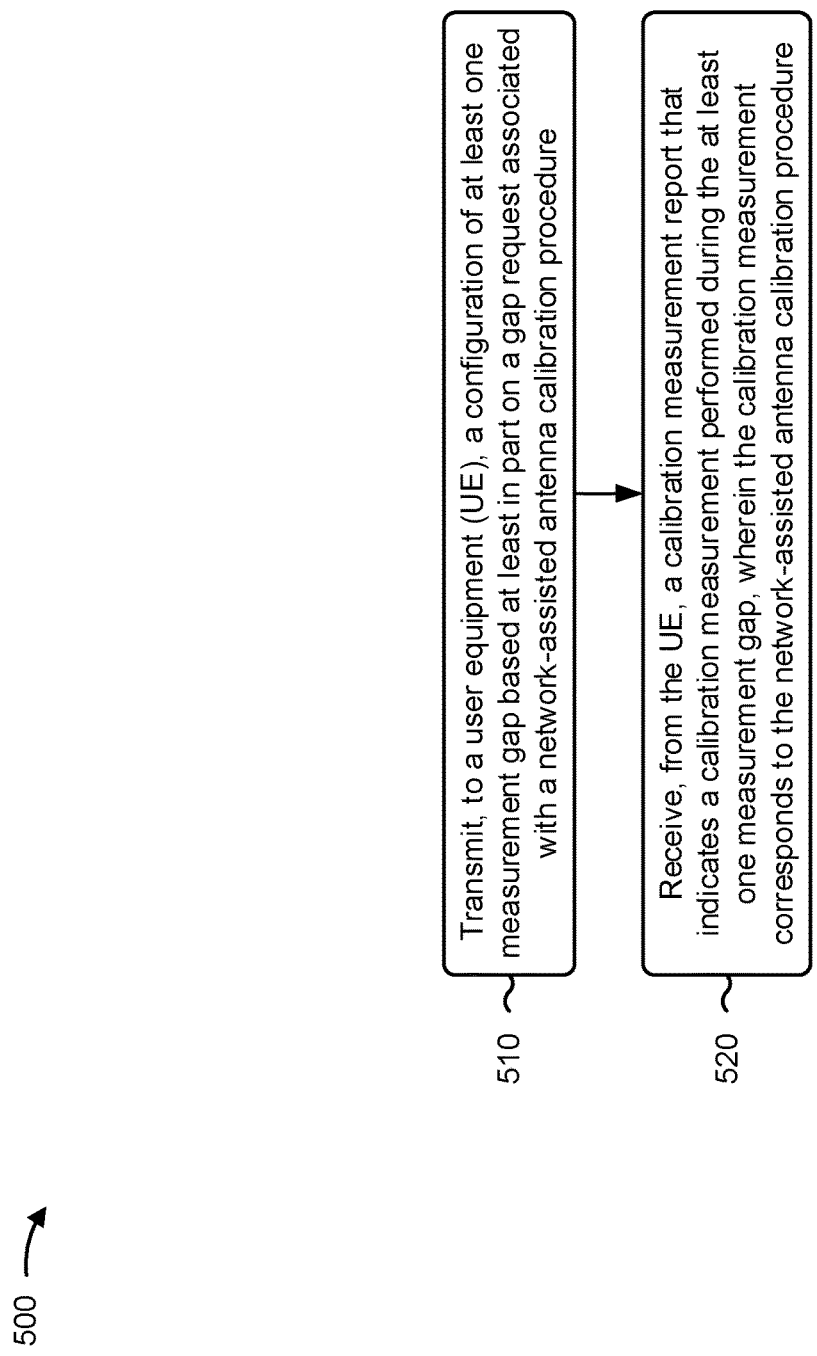

FIG. 5 is a diagram illustrating an example process 500 performed, for example, by a base station, in accordance with the present disclosure. Example process 500 is an example where the base station (e.g., base station 110 and/or the like) performs operations associated with configuring measurement gaps for network-assisted calibration procedures.

As shown in FIG. 5, in some aspects, process 500 may include transmitting, to a UE, a configuration of at least one measurement gap based at least in part on a gap request associated with a network-assisted antenna calibration procedure (block 510). For example, the base station (e.g., using transmit processor 220, controller/processor 240, memory 242, and/or the like) may transmit, to a UE, a configuration of at least one measurement gap based at least in part on a gap request associated with a network-assisted antenna calibration procedure, as described above.

As further shown in FIG. 5, in some aspects, process 500 may include receiving, from the UE, a calibration measurement report that indicates a calibration measurement performed during the at least one measurement gap, wherein the calibration measurement corresponds to the network-assisted antenna calibration procedure (block 520). For example, the base station (e.g., using receive processor 238, controller/processor 240, memory 242, and/or the like) may receive, from the UE, a calibration measurement report that indicates a calibration measurement performed during the at least one measurement gap, as described above. In some aspects, the calibration measurement corresponds to the network-assisted antenna calibration procedure.

Process 500 may include additional aspects, such as any single aspect or any combination of aspects described below and/or in connection with one or more other processes described elsewhere herein.

In a first aspect, the calibration measurement was performed using a beam that is different than a serving beam allocated for a communication between the UE and the base station.

In a second aspect, alone or in combination with the first aspect, process 500 includes transmitting, to the UE, the gap request, wherein the network-assisted antenna calibration procedure comprises a UE-assisted calibration of at least one antenna element on at least one panel is associating with the base station.

In a third aspect, alone or in combination with the first aspect, process 500 includes receiving, from the UE, the gap request, wherein the network-assisted antenna calibration procedure comprises a base station-assisted calibration of at least one antenna element on at least one panel is associating with the UE.

In a fourth aspect, alone or in combination with one or more of the first through third aspects, process 500 includes transmitting, to at least one additional UE, at least one additional configuration of at least one additional measurement gap based at least in part on at least one additional gap request associated with the network-assisted antenna calibration procedure.

In a fifth aspect, alone or in combination with one or more of the first through fourth aspects, the calibration measurement report comprises a dedicated report associated with the network-assisted antenna calibration procedure.

In a sixth aspect, alone or in combination with one or more of the first through fifth aspects, the network-assisted antenna calibration procedure comprises a UE-assisted calibration of at least one antenna element on at least one panel associated with the base station, or a base station-assisted calibration of at least one antenna element on at least one panel associated with the UE.

In a seventh aspect, alone or in combination with one or more of the first through sixth aspects, the configuration of the at least one measurement gap comprises an indication of a UE capability.

In an eighth aspect, alone or in combination with the seventh aspect, the UE capability corresponds to at least one of a first threshold corresponding to a lower bound of a periodicity associated with the at least one measurement gap, a second threshold corresponding to an upper bound of a quantity of measurement gaps of the at least one measurement gap, or a combination thereof.

In a ninth aspect, alone or in combination with the eighth aspect, at least one of the first threshold, the second threshold, or a combination thereof is based at least in part on at least one of a capability report transmitted by the UE to the base station, a calibration objective associated with the UE, a calibration objective associated with the base station, or a combination thereof.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
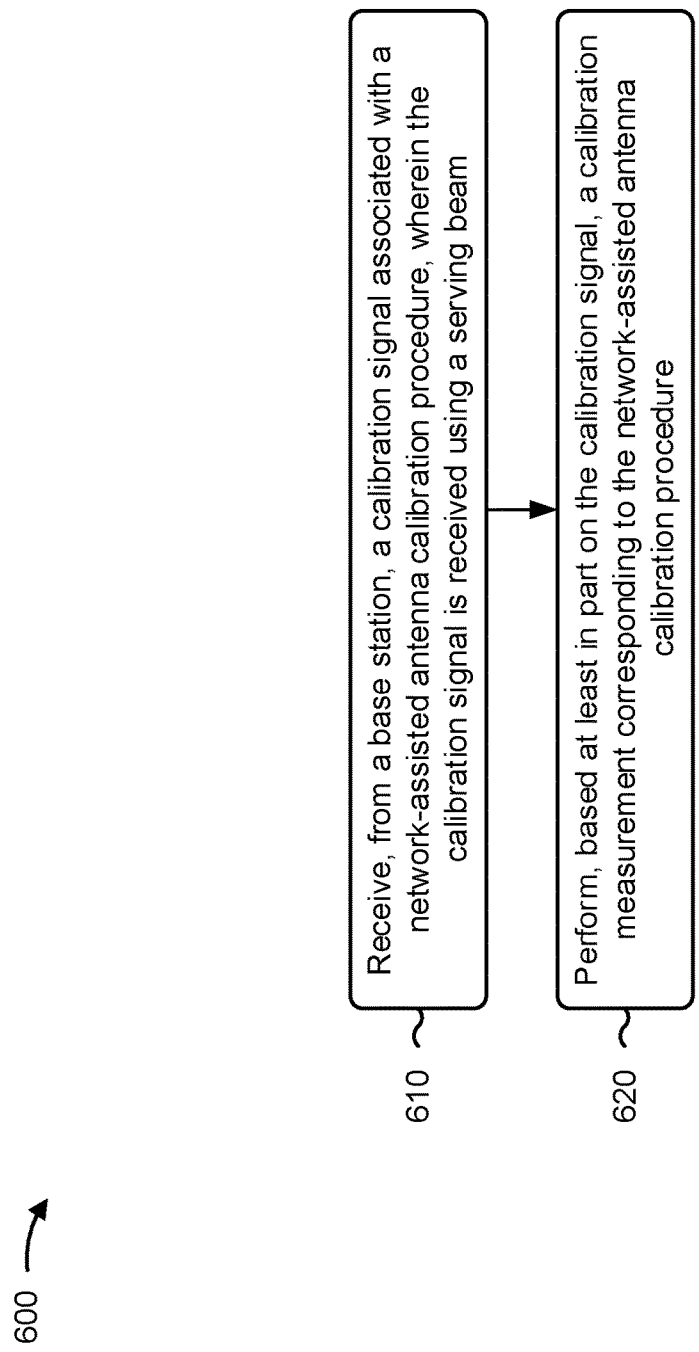
FIGS. 6 and 7 are diagrams illustrating examples associated with using serving beams for network-assisted calibration procedures, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with using serving beams for network-assisted calibration procedures.

As shown in FIG. 6, in some aspects, process 600 may include receiving, from a base station, a calibration signal associated with a network-assisted antenna calibration procedure, wherein the calibration signal is received using a serving beam (block 610). For example, the UE (e.g., using receive processor 258, controller/processor 280, memory 282, and/or the like) may receive, from a base station, a calibration signal associated with a network-assisted antenna calibration procedure, as described above. In some aspects, the calibration signal is received using a serving beam.

As further shown in FIG. 6, in some aspects, process 600 may include performing, based at least in part on the calibration signal, a calibration measurement corresponding to the network-assisted antenna calibration procedure (block 620). For example, the UE (e.g., using receive processor 258, transmit processor 264, controller/processor 280, memory 282, and/or the like) may perform, based at least in part on the calibration signal, a calibration measurement corresponding to the network-assisted antenna calibration procedure, as described above.

Process 600 may include additional aspects, such as any single aspect or any combination of aspects described below and/or in connection with one or more other processes described elsewhere herein.

In a first aspect, receiving the calibration signal comprises receiving an SS/PBCH block, where the calibration signal is multiplexed with the SS/PBCH block.

In a second aspect, alone or in combination with the first aspect, the calibration signal is multiplexed with the SS/PBCH block in a frequency domain.

In a third aspect, alone or in combination with one or more of the first and second aspects, process 600 includes refraining from performing at least one of a beam management procedure, a beam filtering procedure, a beam refinement procedure, or a combination thereof.

In a fourth aspect, alone or in combination with one or more of the first through third aspects, process 600 includes transmitting, to the base station, a calibration measurement report that indicates the calibration measurement.

In a fifth aspect, alone or in combination with the fourth aspect, the calibration measurement report comprises a dedicated report associated with the network-assisted antenna calibration procedure.

In a sixth aspect, alone or in combination with one or more of the first through fifth aspects, the network-assisted antenna calibration procedure comprises: a UE-assisted calibration of at least one antenna element on at least one panel associated with a base station, or a base station-assisted calibration of at least one antenna element on at least one panel associated with the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
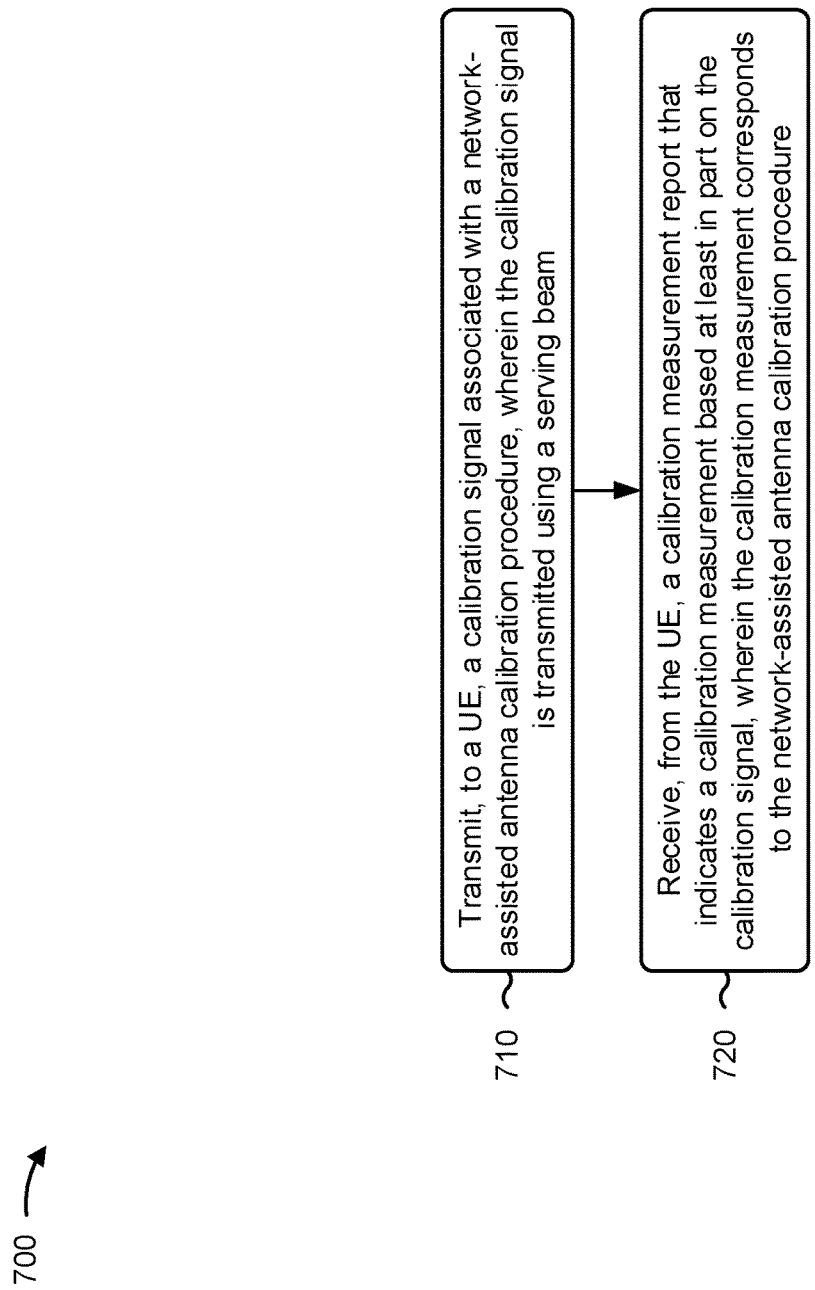

FIG. 7 is a diagram illustrating an example process 700 performed, for example, by a base station, in accordance with the present disclosure. Example process 700 is an example where the base station (e.g., base station 110 and/or the like) performs operations associated with using serving beams for network-assisted calibration procedures.

As shown in FIG. 7, in some aspects, process 700 may include transmitting, to a UE, a calibration signal associated with a network-assisted antenna calibration procedure, wherein the calibration signal is transmitted using a serving beam (block 710). For example, the base station (e.g., using transmit processor 220, controller/processor 240, memory 242, and/or the like) may transmit, to a UE, a calibration signal associated with a network-assisted antenna calibration procedure, as described above. In some aspects, the calibration signal is transmitted using a serving beam.

As further shown in FIG. 7, in some aspects, process 700 may include receiving, from the UE, a calibration measurement report that indicates a calibration measurement based at least in part on the calibration signal, wherein the calibration measurement corresponds to the network-assisted antenna calibration procedure (block 720). For example, the base station (e.g., using receive processor 238, controller/processor 240, memory 242, and/or the like) may receive, from the UE, a calibration measurement report that indicates a calibration measurement based at least in part on the calibration signal, as described above. In some aspects, the calibration measurement corresponds to the network-assisted antenna calibration procedure.

Process 700 may include additional aspects, such as any single aspect or any combination of aspects described below and/or in connection with one or more other processes described elsewhere herein.

In a first aspect, transmitting the calibration signal comprises multiplexing the calibration with an SS/PBCH block.

In a second aspect, alone or in combination with the first aspect, multiplexing the calibration signal with the SS/PBCH block comprises multiplexing the calibration signal with the SS/PBCH block in a frequency domain.

In a third aspect, alone or in combination with one or more of the first and second aspects, process 700 includes transmitting at least one additional calibration signal associated with the network-assisted antenna calibration procedure, wherein the at least one additional calibration signal is transmitted using at least one of the serving beam, an additional serving beam, or a combination thereof.

In a fourth aspect, alone or in combination with one or more of the first through third aspects, the calibration measurement report comprises a dedicated report associated with the network-assisted antenna calibration procedure.

In a fifth aspect, alone or in combination with one or more of the first through third aspects, the network-assisted antenna calibration procedure comprises: a UE-assisted calibration of at least one antenna element on at least one panel associated with a base station, or a base station-assisted calibration of at least one antenna element on at least one panel associated with the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: receiving, from a base station, a configuration of at least one measurement gap based at least in part on a gap request associated with a network-assisted antenna calibration procedure; and performing, during the at least one measurement gap, a calibration measurement corresponding to the network-assisted antenna calibration procedure.

Aspect 2: The method of Aspect 1, wherein performing the calibration measurement comprises performing the calibration measurement using a beam that is different than a serving beam allocated for a communication between the UE and the base station.

Aspect 3: The method of either of Aspects 1 or 2, further comprising receiving, from the base station, the gap request, wherein the network-assisted antenna calibration procedure comprises a UE-assisted calibration of at least one antenna element on at least one panel associated with the base station.

Aspect 4: The method of either of Aspects 1 or 2, further comprising transmitting, to the base station, the gap request, wherein the network-assisted antenna calibration procedure comprises a base station-assisted calibration of at least one antenna element on at least one panel associated with the UE.

Aspect 5: The method of any of Aspects 1-4, further comprising transmitting, to the base station, a calibration measurement report that indicates the calibration measurement.

Aspect 6: The method of Aspect 5, wherein the calibration measurement report comprises a dedicated report associated with the network-assisted antenna calibration procedure.

Aspect 7: The method of any of Aspects 1-6, wherein the network-assisted antenna calibration procedure comprises: a UE-assisted calibration of at least one antenna element on at least one panel associated with the base station, or a base station-assisted calibration of at least one antenna element on at least one panel associated with the UE.

Aspect 8: The method of any of Aspects 1-7, wherein the configuration of the at least one measurement gap comprises an indication of a UE capability.

Aspect 9: The method of Aspect 8, wherein the UE capability corresponds to at least one of: a first threshold corresponding to a lower bound of a periodicity associated with the at least one measurement gap, a second threshold corresponding to an upper bound of a quantity of measurement gaps of the at least one measurement gap, or a combination thereof.

Aspect 10: The method of Aspect 9, wherein at least one of the first threshold, the second threshold, or a combination thereof is based at least in part on at least one of: a capability report transmitted by the UE to the base station, a calibration objective associated with the UE, a calibration objective associated with the base station, or a combination thereof.

Aspect 11: A method of wireless communication performed by a base station, comprising: transmitting, to a user equipment (UE), a configuration of at least one measurement gap based at least in part on a gap request associated with a network-assisted antenna calibration procedure; and receiving, from the UE, a calibration measurement report that indicates a calibration measurement performed during the at least one measurement gap, wherein the calibration measurement corresponds to the network-assisted antenna calibration procedure.

Aspect 12: The method of Aspect 11, wherein the calibration measurement was performed using a beam that is different than a serving beam allocated for a communication between the UE and the base station.

Aspect 13: The method of either of Aspects 11 or 12, further comprising transmitting, to the UE, the gap request, wherein the network-assisted antenna calibration procedure comprises a UE-assisted calibration of at least one antenna element on at least one panel associated with the base station.

Aspect 14: The method of either of Aspects 11 or 12, further comprising receiving, from the UE, the gap request, wherein the network-assisted antenna calibration procedure comprises a base station-assisted calibration of at least one antenna element on at least one panel associated with the UE.

Aspect 15: The method of any of Aspects 11-14, further comprising transmitting, to at least one additional UE, at least one additional configuration of at least one additional measurement gap based at least in part on at least one additional gap request associated with the network-assisted antenna calibration procedure.

Aspect 16: The method of any of Aspects 11-15, wherein the calibration measurement report comprises a dedicated report associated with the network-assisted antenna calibration procedure.

Aspect 17: The method of any of Aspects 11-16, wherein the network-assisted antenna calibration procedure comprises: a UE-assisted calibration of at least one antenna element on at least one panel associated with the base station, or a base station-assisted calibration of at least one antenna element on at least one panel associated with the UE.

Aspect 18: The method of any of Aspects 11-17, wherein the configuration of the at least one measurement gap comprises an indication of a UE capability.

Aspect 19: The method of Aspect 18, wherein the UE capability corresponds to at least one of: a first threshold corresponding to a lower bound of a periodicity associated with the at least one measurement gap, a second threshold corresponding to an upper bound of a quantity of measurement gaps of the at least one measurement gap, or a combination thereof.

Aspect 20: The method of Aspect 19, wherein at least one of the first threshold, the second threshold, or a combination thereof is based at least in part on at least one of: a capability report transmitted by the UE to the base station, a calibration objective associated with the UE, a calibration objective associated with the base station, or a combination thereof.

Aspect 21: A method of wireless communication performed by a user equipment (UE), comprising: receiving, from a base station, a calibration signal associated with a network-assisted antenna calibration procedure, wherein the calibration signal is received using a serving beam; and performing, based at least in part on the calibration signal, a calibration measurement corresponding to the network-assisted antenna calibration procedure.

Aspect 22: The method of Aspect 21, wherein receiving the calibration signal comprises receiving a synchronization signal/physical broadcast channel (SS/PBCH) block, wherein the calibration signal is multiplexed with the SS/PBCH block.

Aspect 23: The method of Aspect 22, wherein the calibration signal is multiplexed with the SS/PBCH block in a frequency domain.

Aspect 24: The method of any of Aspects 21-23, further comprising refraining from performing at least one of: a beam management procedure, a beam filtering procedure, a beam refinement procedure, or a combination thereof.

Aspect 25: The method of any of Aspects 21-24, further comprising transmitting, to the base station, a calibration measurement report that indicates the calibration measurement.

Aspect 26: The method of Aspect 25, wherein the calibration measurement report comprises a dedicated report associated with the network-assisted antenna calibration procedure.

Aspect 27: The method of any of Aspects 21-26, wherein the network-assisted antenna calibration procedure comprises: a UE-assisted calibration of at least one antenna element on at least one panel associated with a base station, or a base station-assisted calibration of at least one antenna element on at least one panel associated with the UE.

Aspect 28: A method of wireless communication performed by a base station, comprising: transmitting, to a user equipment (UE), a calibration signal associated with a network-assisted antenna calibration procedure, wherein the calibration signal is transmitted using a serving beam; and receiving, from the UE, a calibration measurement report that indicates a calibration measurement based at least in part on the calibration signal, wherein the calibration measurement corresponds to the network-assisted antenna calibration procedure.

Aspect 29: The method of Aspect 28, wherein transmitting the calibration signal comprises multiplexing the calibration signal with a synchronization signal/physical broadcast channel (SS/PBCH) block.

Aspect 30: The method of Aspect 29, wherein multiplexing the calibration signal with the SS/PBCH block comprises multiplexing the calibration signal with the SS/PBCH block in a frequency domain.

Aspect 31: The method of any of Aspects 28-30, further comprising transmitting at least one additional calibration signal associated with the network-assisted antenna calibration procedure, wherein the at least one additional calibration signal is transmitted using at least one of the serving beam, an additional serving beam, or a combination thereof.

Aspect 32: The method of any of Aspects 28-31, wherein the calibration measurement report comprises a dedicated report associated with the network-assisted antenna calibration procedure.

Aspect 33: The method of any of Aspects 28-31, wherein the network-assisted antenna calibration procedure comprises: a UE-assisted calibration of at least one antenna element on at least one panel associated with a base station, or a base station-assisted calibration of at least one antenna element on at least one panel associated with the UE.

Aspect 34: An apparatus for wireless communication at a device, comprising a processor; memory coupled with the processor; and instructions stored in the memory and executable by the processor to cause the apparatus to perform the method of one or more of Aspects 1-10.

Aspect 35: A device for wireless communication, comprising a memory and one or more processors coupled to the memory, the one or more processors configured to perform the method of one or more of Aspects 1-10.

Aspect 36: An apparatus for wireless communication, comprising at least one means for performing the method of one or more of Aspects 1-10.

Aspect 37: A non-transitory computer-readable medium storing code for wireless communication, the code comprising instructions executable by a processor to perform the method of one or more of Aspects 1-10.

Aspect 38: A non-transitory computer-readable medium storing a set of instructions for wireless communication, the set of instructions comprising one or more instructions that, when executed by one or more processors of a device, cause the device to perform the method of one or more of Aspects 1-10.

Aspect 39: An apparatus for wireless communication at a device, comprising a processor; memory coupled with the processor; and instructions stored in the memory and executable by the processor to cause the apparatus to perform the method of one or more of Aspects 11-20.

Aspect 40: A device for wireless communication, comprising a memory and one or more processors coupled to the memory, the one or more processors configured to perform the method of one or more of Aspects 11-20.

Aspect 41: An apparatus for wireless communication, comprising at least one means for performing the method of one or more of Aspects 11-20.

Aspect 42: A non-transitory computer-readable medium storing code for wireless communication, the code comprising instructions executable by a processor to perform the method of one or more of Aspects 11-20.

Aspect 43: A non-transitory computer-readable medium storing a set of instructions for wireless communication, the set of instructions comprising one or more instructions that, when executed by one or more processors of a device, cause the device to perform the method of one or more of Aspects 11-20.

Aspect 44: An apparatus for wireless communication at a device, comprising a processor; memory coupled with the processor; and instructions stored in the memory and executable by the processor to cause the apparatus to perform the method of one or more of Aspects of Aspects 21-27.

Aspect 45: A device for wireless communication, comprising a memory and one or more processors coupled to the memory, the one or more processors configured to perform the method of one or more of Aspects 21-27.

Aspect 46: An apparatus for wireless communication, comprising at least one means for performing the method of one or more of Aspects 21-27.

Aspect 47: A non-transitory computer-readable medium storing code for wireless communication, the code comprising instructions executable by a processor to perform the method of one or more of Aspects 21-27.

Aspect 48: A non-transitory computer-readable medium storing a set of instructions for wireless communication, the set of instructions comprising one or more instructions that, when executed by one or more processors of a device, cause the device to perform the method of one or more of Aspects 21-27.

Aspect 49: An apparatus for wireless communication at a device, comprising a processor; memory coupled with the processor; and instructions stored in the memory and executable by the processor to cause the apparatus to perform the method of one or more of Aspects 28-33.

Aspect 50: A device for wireless communication, comprising a memory and one or more processors coupled to the memory, the one or more processors configured to perform the method of one or more of Aspects 28-33.

Aspect 51: An apparatus for wireless communication, comprising at least one means for performing the method of one or more of Aspects 28-33.

Aspect 52: A non-transitory computer-readable medium storing code for wireless communication, the code comprising instructions executable by a processor to perform the method of one or more of Aspects 28-33.

Aspect 53: A non-transitory computer-readable medium storing a set of instructions for wireless communication, the set of instructions comprising one or more instructions that, when executed by one or more processors of a device, cause the device to perform the method of one or more of Aspects 28-33.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive, from a base station, a calibration signal associated with a network-assisted antenna calibration procedure comprising a UE-assisted calibration of at least one antenna element on at least one panel associated with the base station, wherein the calibration signal is received using a serving beam; and perform, based at least in part on the calibration signal, a calibration measurement corresponding to the network-assisted antenna calibration procedure.

2. The UE of claim 1, wherein receiving the calibration signal comprises receiving a synchronization signal/physical broadcast channel (SS/PBCH) block, wherein the calibration signal is multiplexed with the SS/PBCH block.

3. The UE of claim 1, wherein the one or more processors are further configured to refrain from performing at least one of:

a beam management procedure, a beam filtering procedure, a beam refinement procedure, or a combination thereof.

4. The UE of claim 1, wherein the one or more processors are further configured to transmit, to the base station, a calibration measurement report that indicates the calibration measurement.

5. The UE of claim 1, wherein the one or more processors are further configured to:

receive, from the base station, a configuration of at least one measurement gap based at least in part on a gap request associated with the network-assisted antenna calibration procedure, wherein the calibration measurement is performed during the at least one measurement gap.

6. The UE of claim 2, wherein the calibration signal is multiplexed with the SS/PBCH block in a frequency domain.

7. The UE of claim 4, wherein the calibration measurement report comprises a dedicated report associated with the network-assisted antenna calibration procedure.

8. The UE of claim 5, wherein the gap request is received from the base station.

9. The UE of claim 5, wherein the configuration of the at least one measurement gap comprises an indication of a UE capability, and wherein the UE capability corresponds to at least one of:

a first threshold corresponding to a lower bound of a periodicity associated with the at least one measurement gap, a second threshold corresponding to an upper bound of a quantity of measurement gaps of the at least one measurement gap, or a combination thereof.

10. The UE of claim 9, wherein at least one of the first threshold, the second threshold, or a combination thereof is based at least in part on at least one of:
- a capability report transmitted by the UE to the base station,
- a calibration objective associated with the UE,
- a calibration objective associated with the base station, or
- a combination thereof.

11. A base station for wireless communication, comprising:
- a memory; and
- one or more processors, coupled to the memory, configured to:
  - transmit, to a user equipment (UE), a calibration signal associated with a network-assisted antenna calibration procedure comprising a UE-assisted calibration of at least one antenna element on at least one panel associated with the base station, wherein the calibration signal is transmitted using a serving beam; and
  - receive, from the UE, a calibration measurement report that indicates a calibration measurement based at least in part on the calibration signal, wherein the calibration measurement corresponds to the network-assisted antenna calibration procedure.

12. The base station of claim 11, wherein the one or more processors, to transmit the calibration signal, are configured to multiplex the calibration signal with a synchronization signal/physical broadcast channel (SS/PBCH) block.

13. The base station of claim 11, wherein the one or more processors are further configured to transmit at least one additional calibration signal associated with the network-assisted antenna calibration procedure, wherein the at least one additional calibration signal is transmitted using at least one of the serving beam, an additional serving beam, or a combination thereof.

14. The base station of claim 11, wherein the calibration measurement report comprises a dedicated report associated with the network-assisted antenna calibration procedure.

15. The base station of claim 11, wherein the one or more processors are further configured to:
- transmit, to the UE, a configuration of at least one measurement gap based at least in part on a gap request associated with the network-assisted antenna calibration procedure, wherein the calibration measurement is performed during the at least one measurement gap.

16. The base station of claim 12, wherein the one or more processors, to multiplex the calibration signal with the SS/PBCH block, are configured to multiplex the calibration signal with the SS/PBCH block in a frequency domain.

17. The base station of claim 15, wherein the gap request is transmitted by the base station.

18. A method of wireless communication at a user equipment (UE), comprising:
- receiving, from a base station, a calibration signal associated with a network-assisted antenna calibration procedure comprising a UE-assisted calibration of at least one antenna element on at least one panel associated with the base station, wherein the calibration signal is received using a serving beam; and
- performing, based at least in part on the calibration signal, a calibration measurement corresponding to the network-assisted antenna calibration procedure.

19. The method of claim 18, wherein receiving the calibration signal comprises receiving a synchronization signal/physical broadcast channel (SS/PBCH) block, wherein the calibration signal is multiplexed with the SS/PBCH block.

20. The method of claim 18, further comprising:
- refraining from performing at least one of:
  - a beam management procedure,
  - a beam filtering procedure,
  - a beam refinement procedure, or
  - a combination thereof.

21. The method of claim 18, further comprising:
- transmitting, to the base station, a calibration measurement report that indicates the calibration measurement.

22. The method of claim 18, further comprising:
- receiving, from the base station, a configuration of at least one measurement gap based at least in part on a gap request associated with the network-assisted antenna calibration procedure, wherein the calibration measurement is performed during the at least one measurement gap.

23. The method of claim 19, wherein the calibration signal is multiplexed with the SS/PBCH block in a frequency domain.

24. The method of claim 21, wherein the calibration measurement report comprises a dedicated report associated with the network-assisted antenna calibration procedure.

25. The method of claim 22, wherein the gap request is received from the base station.

26. The method of claim 22, wherein the configuration of the at least one measurement gap comprises an indication of a UE capability, and wherein the UE capability corresponds to at least one of:
- a first threshold corresponding to a lower bound of a periodicity associated with the at least one measurement gap,
- a second threshold corresponding to an upper bound of a quantity of measurement gaps of the at least one measurement gap, or
- a combination thereof.

27. The method of claim 26, wherein at least one of the first threshold, the second threshold, or a combination thereof is based at least in part on at least one of:
- a capability report transmitted by the UE to the base station,
- a calibration objective associated with the UE,
- a calibration objective associated with the base station, or
- a combination thereof.

* * * * *